Sept. 27, 1949.　　　L. G. STINE　　　2,483,071
FISHING ROD
Filed Dec. 3, 1947
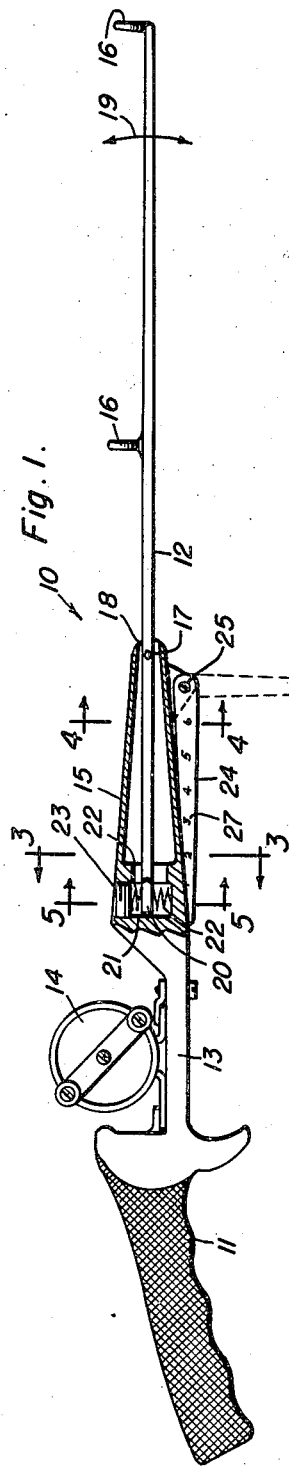
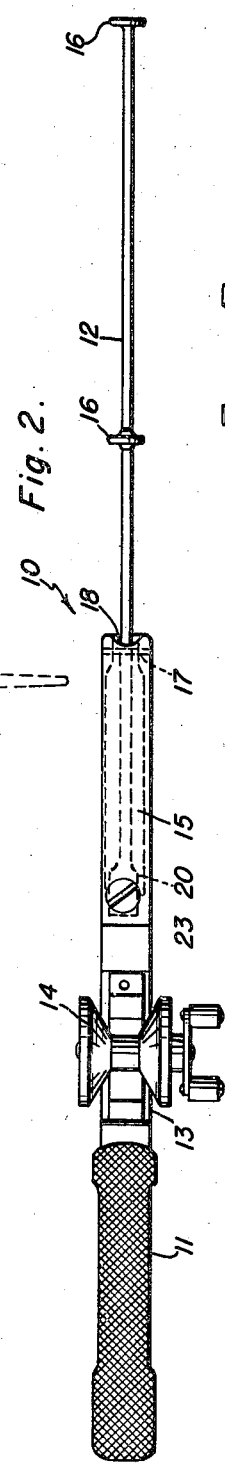
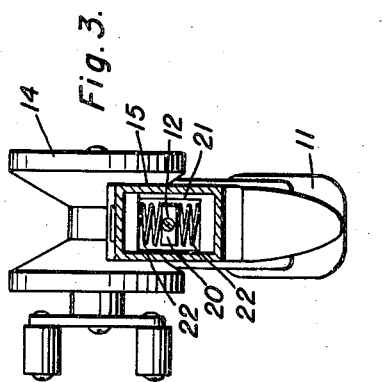
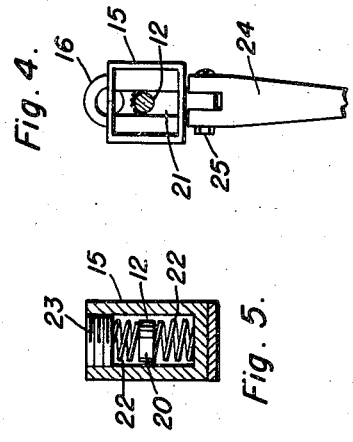
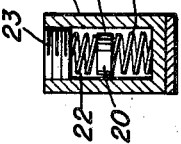
Lester G. Stine
INVENTOR.
BY *Clarence A. O'Brien*
*and Harvey B. Jacobson*
Attorneys Patented Sept. 27, 1949

2,483,071

UNITED STATES PATENT OFFICE 2,483,071

FISHING ROD

Lester G. Stine, Harrisburg, Pa.

Application December 3, 1947, Serial No. 789,398

5 Claims. (Cl. 43—18)

This invention relates to new and useful improvements and structural refinements in fishing rods, and the principal object of the invention is to provide a device of the character herein described, wherein the fishing rod pole portion is movably attached to the handle portion, so that by observing the movement of the pole portion the fisherman may judge the approximate size of the fish which is biting on the fishing line.

A further object of the invention is to provide a fishing rod which is simple in construction and which may be easily and conveniently handled.

Another object of the invention is to provide a fishing rod which will not easily become damaged, which will readily lend itself to economical manufacture, and which is otherwise well adapted for the purpose for which it is intended.

With the above more important objects in view, and such other objects as may become apparent as this specification proceeds, the invention consists essentially of the arrangement and construction of parts as illustrated in the accompanying drawings, in which:

Figure 1 is a side elevational view of the invention, the same being partially broken away to review its construction;

Figure 2 is a top plan view of the invention;

Figure 3 is a cross sectional view, taken substantially in the plane of the line 3—3 in Figure 1;

Figure 4 is a cross sectional view, taken substantially in the plane of the line 4—4 of Figure 1, and Figure 5 is a cross sectional view, taken substantially in the plane of the line 5—5 in Figure 1.

Like characters of reference are employed to designate like parts in the specification and throughout the several views.

Referring now to the accompanying drawings in detail, the invention consists of a fishing rod designated generally by the reference character 10, the same embodying in its construction a handle 11 and what may be referred to as a pole 12.

The handle 11 is formed integrally with an extension 13 on which a suitable reel assembly 14 may be mounted, and a continuation of the extension 13 provides an elongated, forwardly tapered socket 15, configurated substantially as shown.

The pole 12 is, in turn, equipped at its forward end and on its intermediate portion with suitable eyes 16 through which a fishing line (not shown) may freely pass, while the rear end portion of the pole 12 extends into the socket 15 and is pivotally held therein by means of a suitable transverse pin 17 with which the forward end portion of the socket is provided.

Needless to say, the forward end portion of the socket is formed with a suitable opening 18, so as to facilitate a limited amount of pivotal movement of the pole 12, as indicated by the arrows 19.

The rear extremity of the pole 12 is flattened, as indicated at 20, this flattened extremity or pad being disposed in a chamber 21 formed at the inner end of the socket 15, which chamber provides what may be referred to as seats for a pair of opposed, axially alined compression springs 22. It will be noted that the springs are disposed and bear against the relatively opposite surfaces of the flattened extremity 20 of the pole 12, whereby the pole is normally retained in a substantially "centralized" position with respect to the handle 11, by the counter-action of the two springs. If desired, the chamber 21 of the socket 15 may be equipped with a removable plug 23, so as to facilitate insertion of these springs into the chamber.

When the invention is placed in use, the fishing rod is held in the conventional, well known manner, and as long as the fish is not "biting," the pole 12 will be retained in its normal, centralized position with respect to the handle 11, as has been already described.

However, when the fish bite upon the fishing line, the pole 12 will, of course, be caused to oscillate, as it were, in the direction of the arrows 19 against the resiliency of the springs 22, and by observing the extent and frequency of these oscillations, the fisherman may judge the approximate size of the fish involved.

If desired, a tapered member 24 may be pivoted as at 25 to the socket 15, the member 24 being normally disposed adjacent the wall of the socket, but being projectible into a downwardly extending position, as indicated by the phantom lines 26.

The function of the member 24 is two-fold, namely, it may be inserted into the ground so as to support the entire fishing rod in an operative position, and also, the member 24 may be inscribed with a graduated scale 27, on which the fisherman may measure the length of the fish which has been caught.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

1. In a fishing rod, the combination of a handle portion, a pivot thereon, a pole portion mounted on said pivot for oscillatory movement relative to said handle portion, and resilient means on opposite sides of and in direct contact with said pole portion for counteracting the movement of the latter in both directions.

2. The device as defined in claim 1 wherein said means includes a pair of opposing compression springs on said handle portion, said springs engaging said pole portion.

3. A fishing rod comprising a handle provided with a socket, a pole pivoted intermediate its ends to said socket, an end portion of said pole being disposed in said socket and terminating in a flattened extremity, and a pair of opposing compression springs in said socket, said springs bearing against relatively opposite surfaces of the flattened extremity of said pole.

4. In a fishing rod, the combination of a handle provided with a horizontally elongated and forwardly tapered socket having an opening at the forward end thereof, a horizontal pin extending transversely of said socket adjacent said opening, a pole extending into the socket through said opening and having its intermediate portion pivotally mounted on said pin whereby the rear end portion of the pole is swingable upwardly and downwardly in the socket, the rear end portion of said socket defining a vertically elongated chamber affording in the upper and lower ends thereof a pair of spring seats, a substantially flat pad provided at the rear end of said pole and movable vertically in said chamber, and a pair of coacting compression springs positioned in said seats and bearing against the upper and lower surfaces of said pad.

5. The device as defined in claim 4 together with a removable plug provided at one end of said chamber.

LESTER G. STINE.

REFERENCES CITED

The following references are of record in the file of this patent:

UNITED STATES PATENTS

| Number | Name | Date |
|---|---|---|
| 1,549,405 | Bjurstrom | Aug. 11, 1925 |
| 2,306,638 | Meisler | Dec. 29, 1942 |